April 6, 1926.
W. E. BECK
ANTISKIDDING DEVICE
Filed June 16, 1925
1,579,432
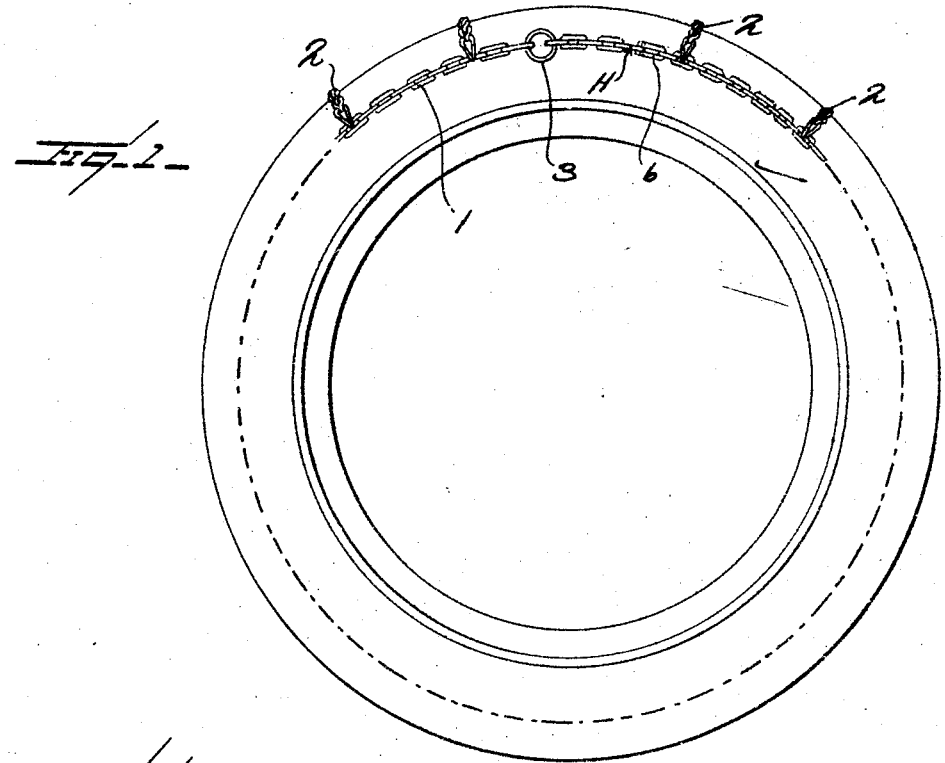
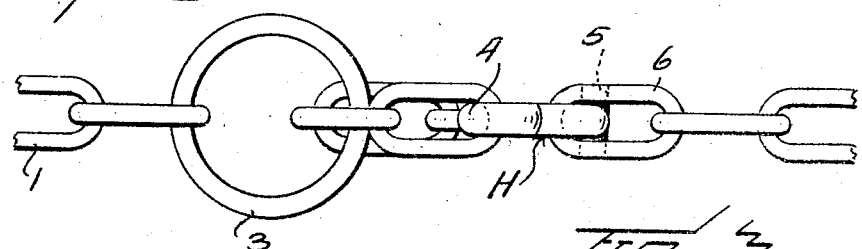
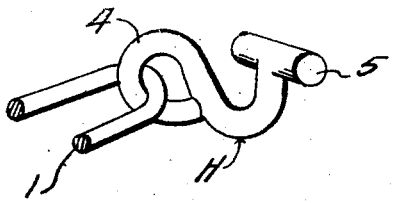
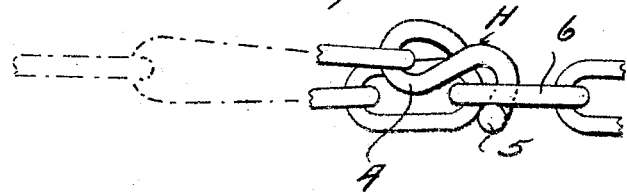
Inventor
W. E. Beck
By Watson E. Coleman
Attorney Patented Apr. 6, 1926.

1,579,432

UNITED STATES PATENT OFFICE.

WILLIAM E. BECK, OF HERRICK, ILLINOIS.

ANTISKIDDING DEVICE.

Application filed June 16, 1925. Serial No. 37,547.

*To all whom it may concern:*

Be it known that I, WILLIAM E. BECK, a citizen of the United States, residing at Herrick, in the county of Shelby and State of Illinois, have invented certain new and useful Improvements in Antiskidding Devices, of which the following is a specification, reference being had to the accompanying drawings.

This invention relates to certain improvements in anti-skidding devices for use in connection with the wheels of automobiles or other vehicles and has relation more particularly to a device of this general character including side chains or members, and it is an object of the invention to provide means whereby each of the side chains may be readily and effectively applied in working position.

Another object of the invention is to provide a device of this character which is adapted to be disposed circumferentially of the wheel and wherein the extremities are provided with means for locking the device in applied position, said means permitting the desired adjustment to facilitate the proper application of the device and avoiding loose ends.

The invention consists in the details of construction and in the combination and arrangement of the several parts of my improved anti-skidding device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation illustrating an anti-skidding device constructed in accordance with an embodiment of my invention in applied position, the major portion of such device being diagrammatically indicated by broken lines;

Figure 2 is an enlarged fragmentary view in side elevation illustrating the meeting ends of a side member in locked engagement;

Figure 3 is a view in top plan of the structure as illustrated in Figure 2 a part of said figure being diagrammatically indicated by broken lines;

Figure 4 is a view in perspective of the hook member as herein disclosed.

As disclosed in the accompanying drawings, the side chains 1 may be of any ordinary or preferred construction and which, when the device is applied, extend circumferentially around the wheel at opposite sides thereof in a well known manner. The side chains 1, at predetermined points, are connected to the cross chains 2 which, when the device is applied, overlie or extend across the tread of the wheel or more particularly the tire carried by said wheel.

An end portion of each of the side chains has operatively engaged therewith a relatively large eye member or ring 3, the interior diameter of said member or ring 3 being such to permit the ready insertion therethrough of a hook member H operatively engaged with the opposite end of said side member or chain 1. The hook member H is substantially S-shaped in form and has one end portion formed into an eye 4 to provide means whereby said hook member may be operatively engaged with a side member or chain. The opposite or outer end portion of the hook member H is provided with a cross head 5 of a length greater than the interior transverse diameter of a link 6 comprised in the side member or chain 1 but readily permitting said end portion of the hook to be inserted through a link 6 when the head 5 is extended in a direction lengthwise of such link. It is also to be noted that the end cross member 2 adjacent to the hooks H is spaced inwardly therefrom a considerable distance so that an effective adjustment of the device may be had to assure its proper application to a wheel.

After the device has been disposed circumferentially of the wheel or more particularly the tire thereof, the hook members H are threaded through the eye members or rings 3 and said end portions of the side chains or members 1 are returned upon themselves and the free end portions of the hook members H engaged or interlocked with the requisite links 6 of the side members or chains. By this means, an effective placement of the device is assured and at the same time eliminating loose ends which would otherwise have a tendency to knock or to require the use of wire or the like to hold the same from flapping.

With the use of my improved device the same can be readily applied by engaging an end portion thereof with the wheel and then starting the motor thereby permitting the requisite application of the device with the wheel in a mud hole, sand and the like.

From the foregoing description it is thought to be obvious that an anti-skidding device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as herinafter claimed.

I claim:—

1. In combination with a link chain, a hook member substantially permanently secured to said chain, the outer end of the hook member having a transversely disposed cross head, said cross head being also disposed transversely of the link chain when strain is imposed upon the chain and hook member, said cross head being of a length greater than the interior transverse diameter of a link in the chain but readily insertable therethrough when the head is disposed lengthwise of said link.

2. In combination with a link chain, a hook member substantially permanently secured to said chain, the outer end of the hook member having a transversely disposed cross head, said cross head being also disposed transversely of the link chain when strain is imposed upon the chain and hook member, said cross head being of a length greater than the interior transverse diameter of a link in the chain but readily insertable therethrough when the head is disposed lengthwise of said link, said hook member being substantially S-shaped in form with its inner end formed into an eye to interlock with a second link of the chain.

In testimony whereof I hereunto affix my signature.

WILLIAM E. BECK.